(12) United States Patent
Burr

(10) Patent No.: US 7,709,805 B2
(45) Date of Patent: May 4, 2010

(54) METHOD FOR GENERATING OPTICAL ANISOTROPY IN SCINTILLATORS USING PULSED LASERS

(75) Inventor: Kent Charles Burr, Latham, NY (US)

(73) Assignee: General Electric Company, Niskayuna, NY (US)

( * ) Notice: Subject to any disclaimer, the term of this patent is extended or adjusted under 35 U.S.C. 154(b) by 727 days.

(21) Appl. No.: 10/632,261

(22) Filed: Aug. 1, 2003

(65) Prior Publication Data

US 2005/0023733 A1 Feb. 3, 2005

(51) Int. Cl.
*G01T 5/00* (2006.01)
(52) U.S. Cl. .............................. 250/370.11; 250/370.08; 250/370.09; 264/1.21; 264/1.37; 264/482
(58) Field of Classification Search ................. 264/400, 264/482, 1.37, 1.21; 250/368, 487.1, 370.08, 250/370.09, 370.11, 366, 367; 378/19
See application file for complete search history.

(56) References Cited

U.S. PATENT DOCUMENTS

| | | | | |
|---|---|---|---|---|
| 3,936,645 | A | * | 2/1976 | Iversen .................. 250/370.11 |
| 4,117,366 | A | | 9/1978 | Davis et al. |
| 4,960,997 | A | | 10/1990 | Watanabe et al. |
| 5,064,684 | A | * | 11/1991 | Mir et al. ..................... 427/555 |
| 6,796,148 | B1 | * | 9/2004 | Borrelli et al. ................ 65/386 |
| 2004/0262526 | A1 | * | 12/2004 | Corbeil et al. .............. 250/367 |

OTHER PUBLICATIONS

Cherry et al., "Micropet: A High Resolution Pet Scanner for Imaging Small Animals," *IEEE Transactions on Nuclear Science*, Jun. 1997, pp. 1161-1166, vol. 44, No. 3, Part 2, New York, NY.
PCT Search Report, PCT/US2004/024982, Jun. 3, 2006.

* cited by examiner

*Primary Examiner*—Mathieu D. Vargot
(74) *Attorney, Agent, or Firm*—Jason K. Klindtworth

(57) ABSTRACT

A method of manufacturing an imaging component is provided comprising placing a focusing device in between a laser generator and a scintillator element; generating a laser using the laser generator; focusing the laser using the focusing device such that a focal spot of the laser is coincident with a portion of the isotropic portion; using the laser to alter the optical properties at the focal spot such that anisotropy is generated in the isotropic portion; and moving the focal spot relative to the scintillator element such that a three-dimensional pattern with altered optical properties is generated. The three-dimensional pattern controls the spread of photons within the scintillator element.

6 Claims, 1 Drawing Sheet

METHOD FOR GENERATING OPTICAL ANISOTROPY IN SCINTILLATORS USING PULSED LASERS

TECHNICAL FIELD

The present invention relates generally to a method of producing optical anisotropy in scintillator materials, and more particularly, to a method of producing optical anisotropy in scintillator elements for use in medical imaging.

BACKGROUND OF THE INVENTION

Medical imaging utilizes scintillators for translating gamma rays or x-rays into optical photons. The scintillators are commonly coupled to photodetectors such that the resultant optical photons can be translated into electric current. In this fashion gamma-rays and x-rays may be detected and utilized in applications such as positron emission tomography (PET), computed tomography (CT), single photon emission computed tomography (SPECT), and x-ray imaging. In these applications, the location of the interaction of the gamma ray or x-ray is determined by the response of the photodetector to the optical photons.

The characteristics and performance of the scintillator, therefore can play a significant role in the imaging performance. The scintillator thickness, for example, must often be increased in order to stop the incoming gamma rays or x-rays with the required efficiency. As the thickness increases, however, the spreading of emitted optical photons within can degrade the spatial resolution of the detector. In order to preserve the spatial information contained in the optical photons, it is desirable to have a scintillator that is optically anisotropic so that the emitted photons are preferentially transported to the photodetector near the point in the scintillator where the gamma ray or x-ray interacted with the scintillator. In applications that rely on centroid detection to determine the position of the interaction, precise control of the optical anisotropy is needed to preserve the spatial information. In addition, precise control is need to allow enough spreading of the signal such that it is shared amongst discrete detector element in such a way as to allow reliable centroid determination. Thus an improved method of controlling the spreading of optical photons within a scintillator would be highly desirable.

Existing approaches to this control have addressed the problem by assembling scintillator packs or blocks from discrete elements, often separated by reflectors. Other approaches generate discrete elements by growing scintillator crystals with a fine needle-like structure. Assembling the scintillator blocks from these discrete elements, however, can be extremely time consuming, and relying on the growth of the needle-like scintillator crystals often does not allow for the precise control over optical properties using existing methods.

In the case of PET scintillator blocks, a wide variety of surface treatments and reflector elements have been used to control the sharing of light between the discrete elements of the block. These treatments and applications further complicate construction. Another method has been to use a saw to make deep grooves into the scintillator in a grid pattern to provide optical isolation between different regions of the scintillator. Often such isolation is only partial. The saw cuts are often filled with a reflective material to improve the optical properties. This saw cut method has the disadvantage of generating relative large dead areas by removal of the scintillator material.

It would, therefore, be highly desirable to have a method of manufacturing an anisotropic scintillator that provided precise control of optical photon spreading within the resultant scintillator. It would additionally be highly desirable to have a method of manufacturing an anisotropic scintillator that was cost effective, reliable, and did not generate unwanted dead space.

SUMMARY OF THE INVENTION

A method of manufacturing an imaging component is provided comprising placing a focusing device in between a laser generator and a scintillator element; generating a laser using the laser generator; focusing the laser using the focusing device such that a focal spot of the laser is coincident with a portion of the isotropic portion; using the laser to alter the optical properties at the focal spot such that anisotropy is generated in the isotropic portion; and moving the focal spot relative to the scintillator element such that a three-dimensional pattern with altered optical properties is generated. The three-dimensional pattern controls the spread of photons within the scintillator element.

Other features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
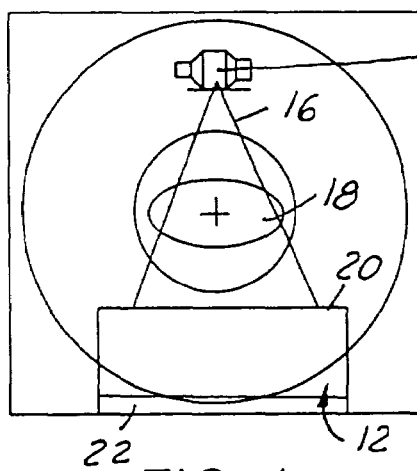
FIG. 1 is an illustration of a medical imaging system utilizing an imaging component in accordance with one embodiment of the present invention.

Referring now to FIG. 1, which is an illustration of a medical imaging system 10 utilizing an imaging component 12 in accordance with the present invention. The medical imaging system 10 is illustrative and is intended to represent a wide variety of imaging systems such as computed tomography (CT), positron emission tomography (PET), single photon emission computed tomography (SPECT), and x-ray imaging. It should be understood that the medical imaging system 10 illustrated is indicative of a CT or x-ray system, but may not be an accurate representation of a PET or SPECT system. In these later systems, the patient is commonly injected with a biologically active radioactive tracer. The tracer is allowed to dwell in the patient for a time such that its distribution is determined by the biological function to be imaged. The radioactive decay of the tracer generates gamma rays that originate in the patient and can be detected by the imaging component 12. The illustrated medical imaging system 10 is therefore not intended as a limitation on the present invention.

The medical imaging system 10 includes a ray generator 14 that produces imaging rays 16, such as x-rays or gamma rays. The imaging rays 16 are passed through an imaging object 18, such as a patient, and in doing so are imparted with information that can be utilized for medical imaging. In order to convert the imaging rays 16 into a usable form, the imaging system includes the imaging component 12 which is comprised of a scintillator assembly 20 in communication with a photo detector 22. The scintillator assembly 20 converts the imaging rays 16 into light photons and the photo detector 22 converts those light photons into electrical currents that can be processed into medical images.

Figure 3:
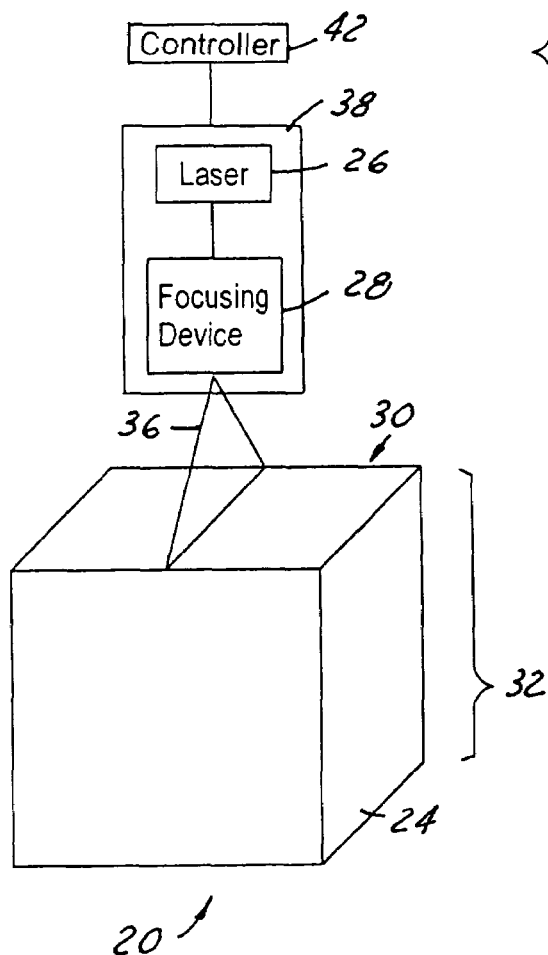
FIG. 3 is a an illustration of the method of producing the imaging component as illustrated in FIG. 2, the imaging component illustrated unprocessed.

Optically anisotropic scintillators are highly desirable for use in many medical imaging applications. The present invention generates just such desirable scintillators utilizing a unique methodology to generate an improved scintillator. As illustrated in FIG. 3, the present invention generates such properties in a scintillator element 24 through the use of a laser generator 26 and a focusing device 28. It is contemplated that a wide variety of scintillator elements 24 may be utilized by the present invention. By way of example, glass scintillators, single crystal scintillators and ceramic elements are all contemplated choices. The scintillator element 24 illustrated in FIG. 3 illustrated in a pre-processed condition 30. In the pre-processed condition 30, the scintillator element 24 comprises an isotropic portion 32 wherein the optical properties are constant. Although in the illustrated figure the entire scintillator element 24 is illustrated as isotropic, it is contemplated that in alternate embodiments only a portion to be modified may be isotropic.

Figure 4:
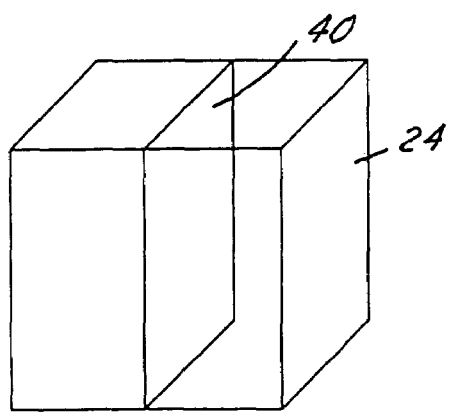
FIG. 4 is an illustration of the imaging component illustrated in FIG. 2, the imaging component illustrated partially processed.

The isotropic portion 32 is modified using the laser generator 26 and focusing device 28. The laser generator 26 is utilized to generate a laser 34. The laser 34, in turn, is focused using the focusing device 28 in order to generate a focal spot 36. The term focal spot 36 is intended to encompass focal volume as well. The laser 34 is utilized to alter the optical characteristics of the scintillator element 24 in the location of the focal spot 36. In this fashion, portions of the isotropic portion 32 are modified to be anisotropic. Through the use of a translation device 38 the position of the focal spot 36 relative to the scintillator element 24 may be moved such that a complex anisotropic portion 40 may be generated (see FIG. 4). Although the translation device 38 is illustrated as modifying the position of the focal spot 36, it should be understood that the same effect can be accomplished through the relative movement of the scintillator element 24. A control device 42 in communication with the translation device 38 as well as the laser generator 26 and focusing device 28 can be further utilized to create complex three-dimensional patterns 44 (see FIG. 2). The control device 42 also benefits by allowing consistent and reliable reproduction of scintillator elements 24.

It is contemplated that a wide variety of optical properties maybe modified to generate the three-dimensional patterns 44 with anisotropic properties at the focal spot 36. It is contemplated that these properties can include, but are not limited to, changing the crystal structure of a crystalline scintillator, creating local crystal domains of different orientation than the surrounding crystalline material in a single crystal, creating localized crystalline regions in otherwise non-crystalline materials (such as glass), generating micro-voids within the scintillator elements 24, changing the index of refraction at the focal spot 36, changing the optical absorption at the focal spot 36, changing the photon scattering properties at the focal spot 36, or by otherwise damaging the scintillator element 24. Detailed descriptions on forming patterns within the bulk of transparent materials are contained in Dmitriev et al. (WO0032349 A1) and Troitski (U.S. Pat. No. 6,333,486 B1) which are herein incorporated by reference.

Although the laser generator 26 has thus far been described generally, it is contemplated that the laser generator 26 is preferably a pulse laser generator. Although nanosecond pulses may be utilized, the present invention is likely to benefit from extremely short pulses commonly referred to as "ultrafast" pulses. One example of these pulses are referred to as picosecond (<10 ps) and femtosecond ($10^{-15}$ s) lasers. The use of ultrafast pulses offers several advantages. The interaction mechanism between the focal spot 36 and the scintillator element 24 is generally a non-resonant, non-linear, multi-photon interaction. Due to the non-resonant interaction, the interaction process is nearly independent of the laser wavelength thereby allowing the same laser generator 26 to be utilized on a wide variety of materials. The non-linear nature of the interaction (the interaction strength does not depend linearly on the laser intensity, but instead increases as the intensity raised to a power) the interaction is strongest in a region smaller than the focal spot 36. With a multi-photon interaction the interaction tends to exhibit a threshold behavior. Below a certain threshold an interaction does not occur. By exceeding the threshold the interaction suddenly turns on. When utilizing tightly focused beams, the threshold is exceeded only in the center of the focal volume 36 to provide tight control. By combining non-linear features with multiphoton interaction can result in features smaller than the focal spot 36 of the laser 34. Thus the use of ultrafast lasers can form features smaller than those generated by longer pulsed lasers.

Figure 2:
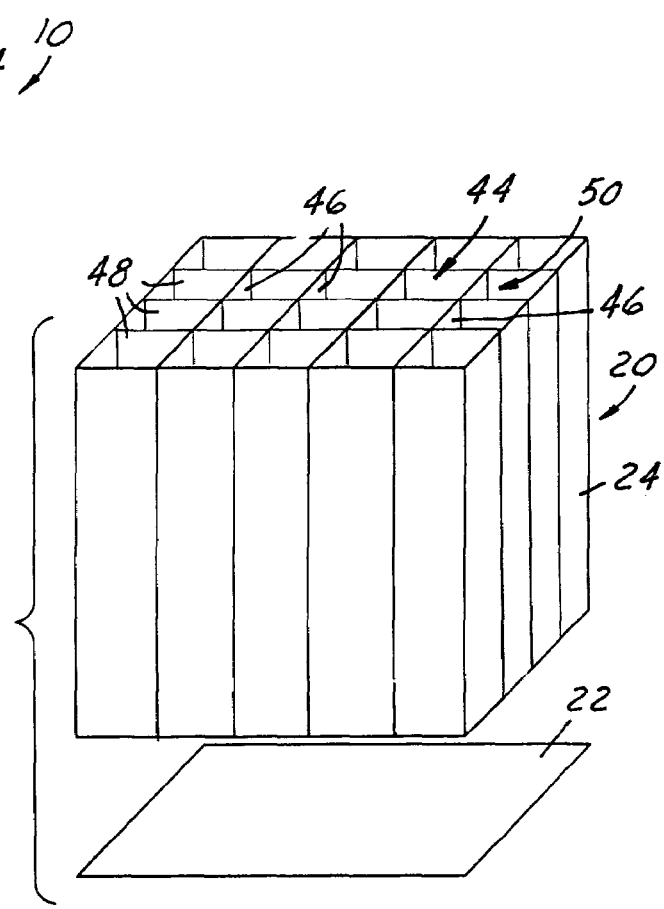
FIG. 2 is a detailed illustration of the imaging component as described in FIG. 1.

The quick interaction produced by ultrafast lasers can create changes in optical properties in small regions without transferring significant heat to the surrounding material. In the example of using ablation to generate micro-voids, excessive heat transfer can result in the creation of cracks or other damage. Ultrafast pulses can cause ablation, however, by direct transition from solid to plasma which results in relatively little heating of the surrounding material. Patterning with ultrafast pulses can therefore create complex patterns with repeatable result. In one example the three-dimensional pattern 44 is illustrated in FIG. 2. The pattern is comprised of a plurality of first parallel planes 46 formed in the scintillator element 24. A plurality of second parallel planes 48 are formed perpendicular to the plurality of first parallel planes 46. In this pattern, a plurality of grid channels 50 in the scintillator element 24. These grid channels 50 can be utilized to guide optical photons to the photodetector 22.

While particular embodiments of the invention have been shown and described, numerous variations and alternative embodiments will occur to those skilled in the art. Accordingly, it is intended that the invention be limited only in terms of the appended claims.

What is claimed is:

1. An anisotropic scintillator for use in an imaging system comprising:

a scintillator element comprised of an isotropic scintillator material having a first optical property;

a three-dimensional pattern formed in said scintillator element utilizing a pulse laser, said pulse laser altering said first optical property at a plurality of discrete locations in said scintillator element such that said three-dimensional pattern is comprised of anisotropic portions and such that said anisotropic portions form localized channel regions in said scintillator element;

wherein said three-dimensional pattern is configured to control the spread of photons to achieve desired signal sharing among the plurality of regions having borders defined by the plurality of discrete locations; and further wherein said anisotropic portions are comprised of at least one optical property selected from a plurality of optical properties to preserve spatial information allowing reliable centroid determination within the anisotropic scintillator.

2. An anisotropic scintillator for use in an imaging system as described in claim 1, wherein said three-dimensional pattern comprises:
   a plurality of first parallel planes formed across said scintillator element; and
   a plurality of second parallel planes formed across said scintillator element perpendicular to said plurality of first parallel planes, said plurality of second parallel planes intersecting said plurality of first parallel planes to form a plurality of scintillator cells.

3. An anisotropic scintillator for use in an imaging system as described in claim 1, wherein said scintillator element comprises a single crystal element.

4. An anisotropic scintillator for use in an imaging system as described in claim 1, wherein said scintillator element comprises a ceramic element.

5. An anisotropic scintillator for use in an imaging system as described in claim 1, wherein said first optical property of said scintillator element is converted to a second optical property without removing material from said scintillator element.

6. An anisotropic scintillator for use in an imaging system as described in claim 1, wherein said first optical property of said scintillator element is converted to a second optical property without adding material to said scintillator element.

* * * * *